United States Patent [19]

Martinez-Vera et al.

[11] Patent Number: 4,880,458
[45] Date of Patent: Nov. 14, 1989

[54] START-UP METHOD FOR A DIRECT REDUCTION PROCESS WITHOUT AN EXTERNAL REFORMER

[75] Inventors: Enrique R. Martinez-Vera, Monterrey; Jorge O. Becerra-Novoa, Rinconada Colonial de Apodaca, both of Mexico

[73] Assignee: Hylsa, S.A. de C.V., Monterrey, Mexico

[21] Appl. No.: 191,702

[22] Filed: May 9, 1988

Related U.S. Application Data

[63] Continuation-in-part of Ser. No. 54,420, May 26, 1987, abandoned, which is a continuation of Ser. No. 752,974, Jul. 8, 1985, Pat. No. 4,668,284, which is a continuation of Ser. No. 494,629, May 16, 1983, Pat. No. 4,528,030.

[51] Int. Cl.$^4$ ............................................. C21B 13/02
[52] U.S. Cl. ............................................. 75/35; 75/91
[58] Field of Search ........................... 75/34, 35, 90, 91

[56] References Cited

U.S. PATENT DOCUMENTS 4,668,284 5/1987 Vera et al. ............................ 75/35

Primary Examiner—Melvyn J. Andrews
Attorney, Agent, or Firm—A. Thomas S. Safford

[57] ABSTRACT

Start-up method for an iron ore direct reduction process, where in the steady-state process the reducing gases are produced by steam reformation of natural gas catalyzed within the reducing zone of the reduction vessel by the reduced ore present therein. During established steady-state operation, a process gas stream is circulated in a reducing gas loop comprising the reduction vessel, a gas heater, and units to remove $H_2O$ and $CO$ from the gas circulating in said loop. Natural gas and water are fed directly to the reducing gas loop as make-up reactants for the reformation. At plant start-up there is a complete absence of metallic iron to catalyze the reformation reaction at any temperature, and a complete absence of $H_2$ or $CO$ so no effective reduction is possible to produce the needed metallic iron. In a multistage start-up, the reduction vessel is first charged with iron ore and pressurized by introducing natural gas to said loop. Simultaneously, the temperature is raised to the range of 400° to 600° C. The natural gas cracks, producing a small amount of $H_2$ and some carbon soot. Second, the temperature is further increased, and injection of water is begun to prevent further carbon deposition, to promote the production of $H_2$, and to avoid $H_2$ consumption; until 3% to 8% by volume of $H_2$ accumulates. Third, at about 750°–820° C., water injection is interrupted favoring the accumulation of hydrogen until a concentration of about 65% is achieved while the temperature of the process gas stream reaches its steady-state value of about 950° C. Fourth, water is again injected to promote the reforming of make-up natural gas within the reduction vessel and all process feeds are adjusted to their steady-state values.

20 Claims, 2 Drawing Sheets

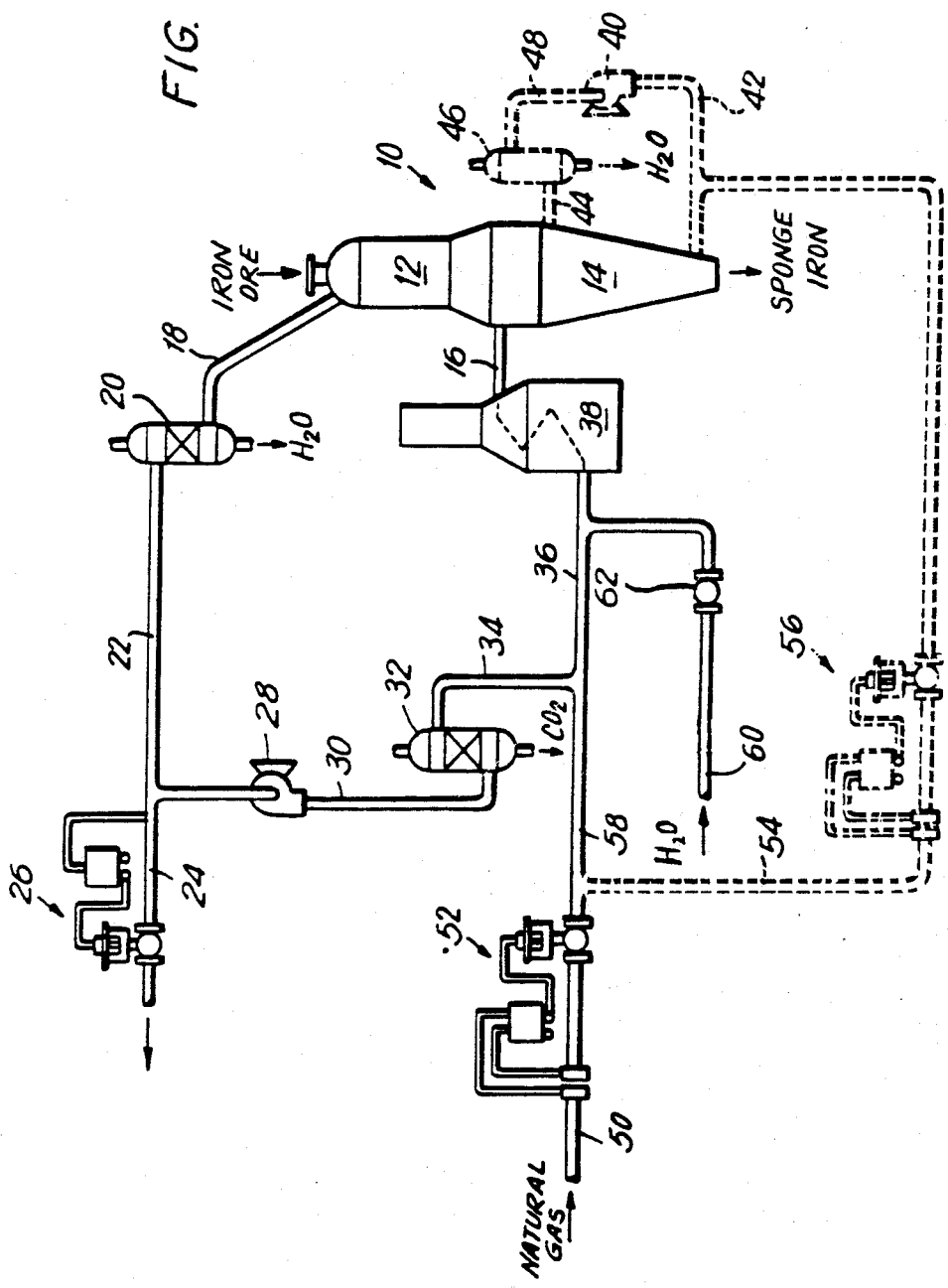

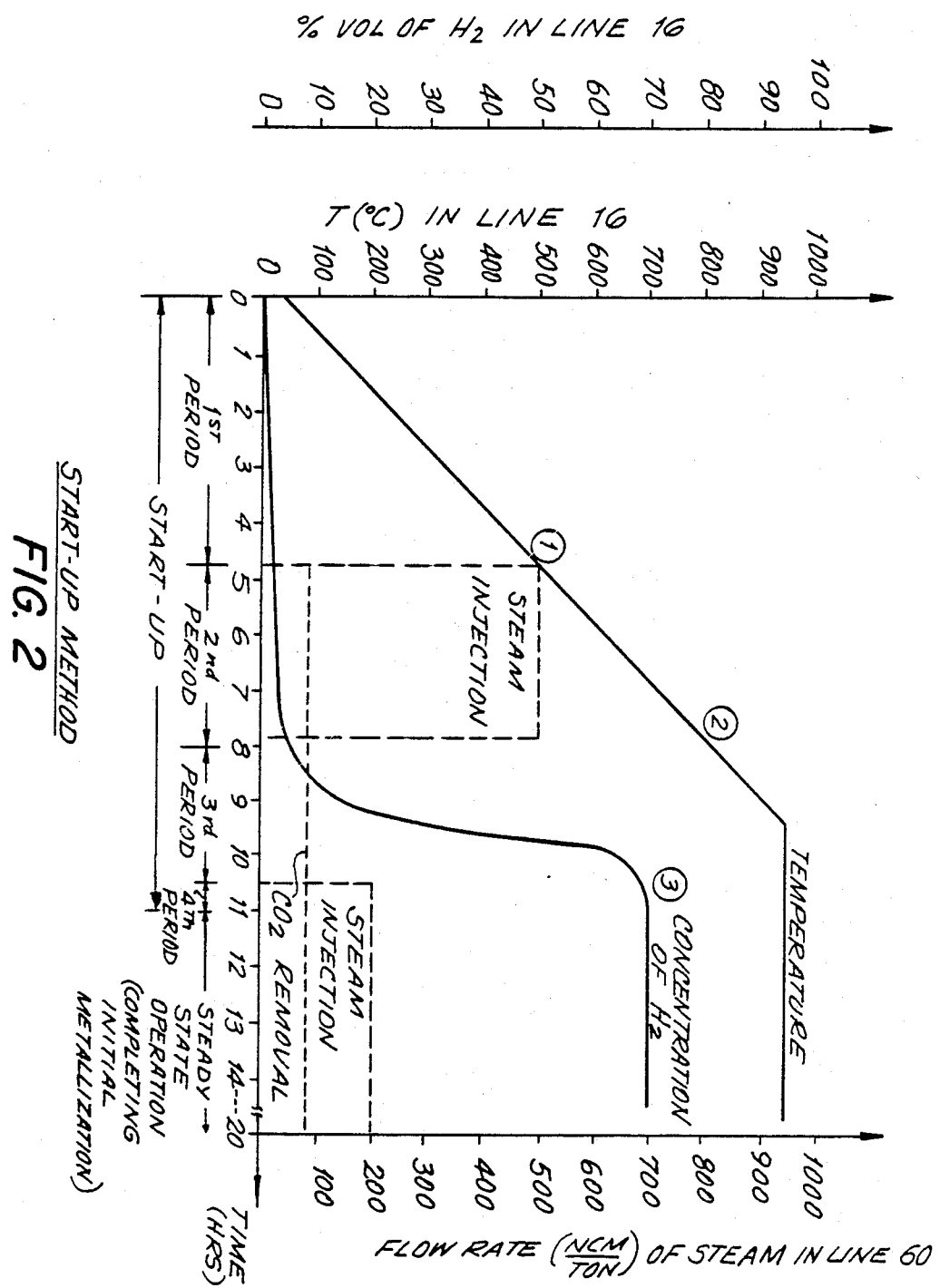

START-UP METHOD FOR A DIRECT REDUCTION PROCESS WITHOUT AN EXTERNAL REFORMER

This is a continuation-in-part of U.S. patent application Ser. No. 054,420, filed May 26, 1987, now abandoned, which is a continuation of U.S. patent application Ser. No. 752,974, filed July 8, 1985, now issued as U.S. Pat. No. 4,668,284, on May 26, 1987 which in turn is a continuation of U.S. patent application Ser. No. 494,629, filed May 16, 1983, now issued as U.S. Pat. No. 4,528,030, on July 9, 1985 (the contents of which applications are incorporated herein by reference).

FIELD OF THE INVENTION

This invention relates to a start-up method for a metal ore reduction process. More specifically, the invention relates to the particularly difficult and heretofore unsolved problem concerning a method for start-up of a process for reducing particulate iron ore to sponge iron in a vertical shaft, moving bed reactor without any outside source of $H_2$ or CO. This process under the steady state conditions taught by the aforementioned patents uses a hot reducing gas mixture composed mainly of hydrogen and carbon monoxide that is derived from a make-up supply of $H_2O$ and natural gas (or other hydrocarbon gaseous at the reducing temperatures).

BACKGROUND OF THE INVENTION

Typical gaseous reduction systems are disclosed, for example, in U.S. Pat. Nos. 3,748,120; 3,765,872; 3,905,806; 4,046,557; 4,099,962 and 4,150,972. These all teach the use of an external reformer to catalytically convert natural gas and steam into carbon monoxide and hydrogen for use as an iron ore reducing agent. This reformed gas is then passed through a bed of particulate ore at temperatures on the order of 760° to 1,000° C. to produce sponge iron.

It is well known that the hydrocarbons of natural gas per se have some reducing capacity, but are effective only at such high temperatures as to be impractical for direct use in any sponge iron process. In order for direct reduction by natural gas to be effective to give metallizations in excess of 80%, temperatures above 1000° C. would be necessary, which would cause agglomeration. Such agglomeration of particles causes problems in solids flow through the reactor resulting in unacceptably uneven processing and often in complete blockage. See U.S. Pat. No. 4,268,303.

While reduction systems using natural gas reformed with $H_2O$ or $CO_2$ have been extensively used commercially, the catalytic reformers they employ are costly pieces of equipment and form a substantial part of the capital investment in a such sponge iron producing plant. They are also an additional source of heat loss.

U.S. Pat. No. 3,827,879 shows an even earlier attempt to practice gaseous direct reduction of iron ore With natural gas without any external reformer. However, this differs significantly in that it discloses a fixed bed process that uses methane injection alone (without steam addition), oxidized by partial combustion with oxygen (requiring separate combustion chambers) to obtain most of the hydrogen and carbon monoxide used for reduction.

Other patents such as U.S. Pat. Nos. 4,246,024; 4,253,867; and 4,261,734 have disclosed methods using gasifier gas or coke oven gas as a feed to a sponge iron reduction system which does not have an external reformer. However, in all the feed gases proposed for such systems, typically each already has $H_2$ and/or CO as at least the major portion of such feed gas. For example, the gas composition of coke oven gas typically includes about 50% $H_2$ and 7% CO in addition to about 30% $CH_4$. In contrast, at least 95% of natural gas typically is composed of hydrocarbons. See Chemical Engineer's Handbook, John Perry ed. 4th edition, table 9-11.

It is, accordingly, an object of the present invention to provide a method for start-up of an iron ore reduction process which eliminates the need for an external reformer, a coking installation, a gasifier unit, or any other similar accessory equipment for generating effective reducing gas containing high percentages of $H_2$ and CO, or for any pre-existing catalyst.

It is a further object of the invention to provide a method wherein hydrocarbon, gaseous at reducing temperatures (preferably in the form of natural gas) and water (preferably in the form of steam) are the only make-up needed for supplying the reduction process during both its start-up and its subsequent normal steady-state operation.

Other objects of the invention will be in part obvious and in part pointed out hereafter.

The aforementioned parent U.S. Pat. No. 4,528,030 provides a partial solution to some of the foregoing objectives, at least under steady-state conditions. That patent discloses that by adding a make-up of gasifiable hydrocarbon and $H_2O$ (preferably as natural gas and steam) in the proper proportions to the already-established recycle reducing gas circulating through a bed of partially-reduced iron ore, metallizations of 90% or greater can be achieved at temperatures of 800° to 1,000° C. without any costly separate reformer equipment at all and without the formation of large agglomerates.

Lower investment and operating costs as well as fuel conservation can also be achieved by this elimination of an external reformer, because the heat losses and inefficiencies associated with such additional separate equipment are avoided.

The above-mentioned method uses the catalytic potential of the sponge iron to reform within the reducing reactor the gaseous hydrocarbons into a mixture of hydrogen and carbon monoxide using steam as the oxidizing agent. However, with such a process, during the start-up procedure no sponge iron will be available within the reactor. A possible solution could be to charge the reactor initially with sponge iron already produced somewhere else. This proposal is not usually feasible, and has the further disadvantage that the sponge iron is a material with weak mechanical characteristics and consequently a significant amount of fines will be produced during the charging procedure causing severe problems in the gas distribution through the bed and making impossible a smooth start-up. Another possible solution could be the utilization of an external source of reducing gas such as an external reformer to be used only during the start-up procedure to reduce the first batch of iron ore and produce the required sponge iron to initiate the in-situ reforming of gaseous hydrocarbons. The investment costs, however, of such a stand-by start-up reformer would be unacceptable. Finally, heating a cold bed of iron ore with a circulating stream of steam and natural gas fails to establish any effective reduction of the ore.

In unique recognition of this, applicants have developed a start-up method of great utility and technical advantage which is wholly independent of the use of pre-existing sponge iron or of any external source of effective reducing gas (i.e., H₂ or CO).

INTRODUCTION TO THE INVENTION

The difficult problem recognized by applicants in attempting to start-up a reduction process in which no external reformer is used or even available is how initially to provide sufficient hydrogen and carbon monoxide from the raw natural gas make-up so as to produce the metallic iron necessary for catalyzing the internal reforming reaction (without resorting to use of an external H₂ and/or CO source, which would defeat the process objective of lowering equipment and operating costs). In other words, hydrogen and/or carbon monoxide are necessary to obtain the metallic catalyst for the very reaction needed to produce such hydrogen and carbon monoxide.

The applicants have discovered how to overcome this quandary by controllably regulating the temperature and flow rates of natural gas and water fed to the reactor in sequenced steps over predetermined ranges to give an effective start-up of a direct reduction process for producing sponge iron without any external reformer.

BRIEF DESCRIPTION OF THE INVENTION

In accordance with a preferred embodiment of the invention, the start-up process is begun by pressurizing the plant at ambient temperature with natural gas, typically from 2 to 6 kg/cm², and preferably at about 4 kg/cm². The pressurized natural gas stream is circulated in a gas loop comprising the reduction zone of the reactor (containing a bed of iron ore), a gas heater, and units for H₂O and CO₂ removal. As the plant is pressurized, the temperature in the gas heater is simultaneously increased at a controlled rate until a temperature favoring the thermal cracking of the hydrocarbons in the natural gas feedstock is reached. Consequently, the temperature of the reducing zone within the reactor will also be increased. A make-up stream of natural gas is added as needed to the reducing gas loop to make up for the natural gas consumed. The cracking temperature is typically from 400° to 500° C., according to the following reaction:

$$C_nH_{2n+2} \rightarrow nC + (n+1)H_2 \tag{1}$$

Such thermal cracking initiates the accumulation of a small amount of hydrogen in the reducing loop. It also begins a potentially adverse accumulation of carbon soot.

As the temperature is further increased in the gas heater, the resulting increase of the temperature in the reactor begins to favor (to a limited degree in the absence of a catalyst) the following reforming reaction (whose preferred range is above 650°).

$$CH_4 + H_2O \rightarrow CO + 3H_2 \tag{2}$$

At certain temperatures the water-gas-shift reaction is also formed:

$$CO + H_2O \rightleftharpoons CO_2 + H_2 \tag{3}$$

Starting at about 500° C., water is injected into the gas stream fed to the reactor and in an amount sufficient to prevent carbon deposition in the reactor. Conventional quench cooling is applied to the effluent gas removed from the reduction zone (as needed in order to protect the compressor, piping and other equipment from the high temperatures and abrasive dust in the gas stream circulating in the process gas loop). This quench also removes H₂O which is an oxidant by-product of any H₂ reducing reactions.

In order to avoid damage to the gas heater, it is desirable to maintain the reactor gas feed at a constant flow rate, and thereby avoid sudden temperature fluctuations in the tubes of the heater. To maintain this constant flow rate, the recycled gas feed to the reactor is decreased during this water injection in such a way that the total flow fed to the heater remains constant.

With the initiation of water injection, the removal of carbon dioxide is also begun from the cooled gaseous reactor effluent prior to being recycled to the reactor. At this stage, a further small amount of reducing gas (predominantly H₂) begins to form as the temperature continues to rise. Because there is essentially no catalyst (i.e., metallic iron) for the reformation reactions, only a small percentage of reducing gas is formed. However, it has been discovered that a threshold amount of about 3% H₂ is necessary and can be achieved at this stage.

Then as the temperature rises sufficiently to begin to favor reduction by H₂ and CO, i.e. in the range of about 750° to 820° C., the water injection is interrupted. This preferably occurs at about 800° C. The removal of water favors the reduction of the iron ore feed by the relatively small amount of accumulated hydrogen and carbon monoxide, according to the following simplified reactions:

$$Fe_nO_m + mH_2 \rightarrow nFe + mH_2O \tag{4}$$

$$Fe_nO_m + mCO \rightarrow nFe + mCO_2 \tag{5}$$

where n=1, 2 or 3 when m=1, 3 or 4, respectively. This will produce just sufficient metallic sponge iron to be available to begin effectively to catalyze the reforming reactions. For example, the H₂ reduction of iron ore produces metallic iron and water which latter in turn is consumed in the reforming reaction catalyzed by the newly formed iron. By interrupting the water injection and continuing water removal by quench cooling of the recycle gas, the concentration of the oxidant, i.e. water, is lowered in the reducing zone and thus aids in favoring the reducing capacity of the circulating gas at the optimum reducing temperature range.

The reducing and reforming reactions taking place in the reduction zone relatively rapidly lead to the generation of sufficient hydrogen (e.g. 60 to 70%) and carbon monoxide (e.g. 5 to 9%) in the recycle gas loop so as to allow the subsequent adjustment of all process feeds to their steady-state values. This point may be reached about two hours after interrupting the water injection.

The injection of water to the reactor is then re-initiated and addition of natural gas to the process is adjusted as required to maintain adequate concentrations of reducing gas (which is normally controlled by maintaining a constant pressure) according to the operating steady-state conditions. At this point, start-up has been essentially achieved (as far as the reducing gas compositions are concerned).

The reactor need not be fully charged with ore from the beginning. However, it is helpful to have a substantial initial charge to function as a heat sink to protect the heater against too rapid a temperature rise. Thus, some continued increase in the bed of ore in the reactor during the start-up is permissible. Also, during these start-up steps, the ore particles in the reactor are preferably kept moving, at least intermittently, as needed so as to avoid excessive compaction of the bed. Some ores, if heated without interparticle motion, develop high interparticle strength and form agglomerations which later cause difficulties in the flow of solids by gravity through the reactor. This tends to be a greater problem in the larger reactors.

The flow rate of ore particles through the reactor is gradually increased so as to be continuous and to reach the normal production rate at the end of the overall start-up process. It may take, for example, several more hours after reinitiating water injection, depending on the plant size, to bring the plant up to normal production levels (so that the moving bed of ore in the reducing zone attains the normal steady-state profile for degree of reduction).

BRIEF DESCRIPTION OF THE DRAWINGS

In this specification and the accompanying drawings, applicants have shown and described several preferred embodiments of their invention and have suggested various alternatives and modifications thereto, but it is to be understood that these are not intended to be exhaustive and that many changes and modifications can be made within the scope of the invention. These suggestions herein are selected and included for purposes of illustration in order that others skilled in the art will more fully understand the invention and principles thereof and will thus be enabled to modify it and embody it in a variety of forms, each a may be best suited to the conditions of a particular use.

FIG. 1 is a schematic flowsheet of a direct reduction process, equivalent to that shown in U.S. Pat. No. 4,528,030, to which the start-up method embodying the present invention can be applied.

FIG. 2 is a graphic representation over time of the steps of the start-up method embodying the present invention.

DETAILED DESCRIPTION OF A PREFERRED EMBODIMENT

Referring to FIG. 1, numeral 10 designates a conventional vertical shaft, moving bed, gaseous reduction reactor having a reduction zone 12 in the upper part thereof and optionally a cooling zone 14 in the lower part thereof.

When it is desired to produce hot sponge iron, then the lower portion of the reactor is not a cooling zone but can be merely a discharge zone (See U.S. application Ser. No. 898,940) or, if needed, can alternatively be a zone which can be used to adjust the carbon content and the temperature of the hot sponge iron (See U.S. Pat. No. 4,734,128).

During steady-state operations, iron ore is fed to the top of zone 12 and flows downwardly through the reactor. The reduction zone 12 of reactor 10 forms part of a reducing gas loop. Hot reducing gas largely composed of hydrogen and carbon monoxide flows through a pipe 16 to the bottom of the zone 12 and thence upwardly through the body of particulate iron ore therein to reduce the descending ore to sponge iron. The partially spent off-gas leaves the reactor through a pipe 18 and is cooled and de-watered in a quench cooler 20 having a gas outlet pipe 22. The gas flowing through pipe 22 is divided, one portion thereof is removed from the system through pipe 24, containing back pressure regulator 26, and the remainder is recycled to the reduction zone 12. This small amount of gas vented through pipe 24 is useful as a system pressure process control, as well as preventing build up of unwanted gases such as $N_2$, He, etc. (sometimes present in natural gas). For thermal efficiency, the vented gas can go to burners (such as for heater 38). More particularly, the recycled portion of the cooled and de-watered gas is pumped by compressor 28 through pipe 30 to a carbon dioxide absorption unit 32 wherein $CO_2$ is removed from the recycle gas to reduce the carbon content thereof. The $CO_2$ absorption unit can be of the conventional MEA type (see, for example, U.S. Pat. No. 4,714,597). From absorption unit 32 the recycle gas flows through pipes 34 and 36 to a heater 38 wherein it is heated to a suitable reducing temperature e.g. 950° C. and thence flows through pipe 16 to the reduction zone.

In FIG. 1, a conventional cooling loop is shown. This includes compressor 40, the cooling zone 14, and quench cooler 46, joined by piping 42, 44, and 48, respectively. Make-up gas in the form of natural gas from pipe 54 can be metered in via flow controller 56. The cooling zone 14 can be essentially isolated from the reduction zone 12, or can have some minor up-flow (as taught by U.S. Pat. No. 4,556,417). As previously indicated, for cost effectiveness and energy conservation, the cooling loop may be omitted altogether and the zone 14 be merely a discharge zone.

Natural gas (or other hydrocarbon gaseous at reducing temperatures) from a suitable source enters the system through a pipe 50 containing a flow controller 52 (assuming such source gas is gaseous at this point). The entering natural gas flows through pipe 58 to the reducing gas loop. Water is added through pipe 60 containing a control valve 62 and enters the reducing gas loop near the point of introduction of natural gas. If the water is supplied to pipe 60 in the form of steam, then the valve 62 can be part of a flow controller. In this embodiment, make-up natural gas and steam are mixed with each other and with the recycle gas before they are heated and fed to the reactor.

With reference to FIGS. 1 and 2, in order to start-up the reduction process, reactor 10 is filled up with iron ore and sufficient natural gas is introduced to the reduction loop through pipe 50 to reach the operating pressure. In pilot plant studies, a natural gas flow of 300 NCM/ton of Fe was found to be sufficient for such a purpose. Concurrently, the temperature of the gas heater 38 is increased from room temperature to a value of approximately 500° C. in the gas stream flowing through pipe 16 (preferably, at the rate of about 100° C./hr., to avoid damage to equipment by too rapid heating). This rate of heating will be understood to be an equipment limitation (to avoid thermal shock to the heater). During this first period of the start-up method, limited thermal cracking of the hydrocarbons contained in the natural gas feed occurs, leading to carbon deposition and to the production of a small amount of hydrogen (approximately 3–8% by volume of the recycle gas), forming a nascent process gas.

Referring to FIG. 2, it is seen that during this first period of the start-up, the temperature range from ambient to about 400° C. is not favorable to the kinetics of the thermal cracking reaction. Hence, it is not necessary to inject steam during this initial phase to inhibit carbon deposition. During these initial start-up periods, the purge through line 24, preferably, is not operated. This hastens the build-up of $H_2$ and CO.

Next, in the second period of start-up, the temperature of the natural gas feed in pipe 16 is increased from approximately 500° C. to about 800° C. by the gas heater 38. During this second temperature range it becomes necessary to inject sufficient steam through pipe 60 into the reactor 10 to inhibit both the deposition of carbon, which would otherwise interfere with the general gas flow distribution and the intra-particulate gas diffusion within the reactor, and the reduction reaction, which would prematurely consume hydrogen. As shown in FIG. 2, steam is injected at the rate of 500 NCM/ton of Fe in the ore. To maintain a constant flow rate to the gas heater 38, and thereby avoid any sudden adverse temperature changes, the injection of steam to the system is coupled with an attendant decrease in the gas recycled (e.g. to 1500 NCM/ton). In the aforementioned pilot plant studies, a steam to carbon molar ratio of 0.2 to 0.4 was found to be sufficient to inhibit carbon deposition and to hinder reduction of oxides (avoiding the consumption of the accumulated hydrogen, which would not be replaced at this stage).

Such injection of steam not only inhibits carbon deposition, but also causes some reforming of the hydrocarbons in the natural gas feed. The reforming that occurs in this second period is not very much, due both to the relatively low temperature and to the virtual absence of metallic iron to act as a reforming catalyst. Nevertheless, it is necessary to remove the $CO_2$ which is generated. Consequently, the $CO_2$ removal system 32 is activated during this second period and continues thereafter (see FIG. 2, which shows the time span for $CO_2$ removal, but is not intended to show flow rate). As shown in FIG. 2, the $H_2$ content of the gas at pipe 16 flowing to the reactor inlet is increased to at least 3 to 8% by volume during this second period but little, if any, will accumulate beyond that range.

In the third period of the start-up according to the present invention, the steam feed to the reactor is interrupted, while the temperature of the system increases from approximately 800° C. to about 950° C. This unique and unobviously coordinated step allows the small amount of hydrogen then present in the system to reduce some of iron ore feed; thus making sufficient metallic iron product available to act as a catalyst for the reforming reaction. A threshold level of $H_2$, preferably at least 3% by volume, should be present at the start of the third period. Any less will jeopardize the success of the start-up, because insufficient metallic iron will be produced. Some cracking will be re-initiated, but as the temperature is increased in the aforementioned range, the kinetics of both the reduction and reforming reactions are favored (see equations 2, 4 and 5 above). With the steam interrupted, these reactions cooperatively proceed. The hydrogen present reduces more iron ore, thereby providing more metallic iron catalyst to be available for use in the reforming reaction (as well as providing steam as a by-product to be locally available in non-cumulative amounts for use in the reforming reaction). The increase in the reforming reaction in turn produces more hydrogen. Thus, an unexpected autocatalytic effect is achieved by the disclosed method. This is triggered by stopping steam addition once a threshold amount of reducing gas is present and once the temperature sufficiently favors the reduction and reforming reactions (i.e. is above about 750°–820° C.).

During this third period, it is necessary to increase the natural gas flow to the reactor through pipe 50 so as to compensate for interrupted steam flow, for the natural gas consumed by the increased volume of reforming, and for the $CO_2$ and $H_2O$ removed. Eventually, the hydrogen and carbon monoxide level in the gas stream fed to the reactor through pipe 16 increases to a level between about 50 and 70% and preferably approximately 60% by volume at a temperature of about 950° C., thus reaching the desired reducing potential for the process gas.

At this point, with such significant levels of $H_2$ and CO present in the recycle gas, the fourth and final period of the start-up is implemented by re-initiating injection of steam to the process in order to promote the reforming reaction (with the added natural gas) and to control carburization. The flow rate of the bed of ore is then increased gradually once a satisfactory level of metallization of the ore is achieved.

An unexpected and significant aspect of the disclosed invention, which is of great utility in reducing plant operating costs, is that start-up can be achieved within a shorter period of time than is required in iron ore reduction processes which incorporate a reformer. Start-up within 11 hours has been achieved, as compared with the period of more than 2–2½ days required in conventional start-up systems having external reformers. Metallization of the iron ore has been found to increase a few hours after the conclusion of start-up, and shortly thereafter the ore feed also reaches a steady-state (in the exemplary pilot plant operation, this took less than an additional nine hours, for a total elapsed time of under 20 hours).

The curves in FIG. 2 may vary in shape and in the significant points, depending upon the type of iron ore being processed and upon the manipulation of the controls by the operator. However, variations should not be so much as to injure the equipment (heater, etc.) or fail to sustain the desired reaction sequences.

What is claimed is:

1. A method of start-up of an iron ore reduction moving-bed process, without the use of an external reformer or other external source of $H_2$ and/or CO, of the type wherein under steady-state conditions a stream of reducing gas comprising hydrogen and carbon monoxide is circulated in a loop comprising within a reactor a reducing zone containing particles of iron ore which are reduced to sponge iron therein, a gas heater, a water removal unit and a carbon dioxide removal unit, and wherein the reducing gas is produced within said reactor by reformation with water of source gas in the form of natural gas or of other hydrocarbons which are gaseous at reforming temperatures, which method comprises:

(a) introducing an at least partial charge of iron ore into said reactor which is essentially devoid of sponge iron and adding additional ore as needed, (b) introducing source gas into said loop as needed so as to establish and maintain a predetermined operating range of pressure, while also heating the source gas to cracking temperatures in the range of 400° to 500° C., during which a small amount of reducing gas is produced to form a nascent process gas stream circulating in said loop, (c) thereafter injecting water into said loop for feeding into said reducing zone and in an amount to give a molar water to carbon ratio effective to inhibit carbon deposition before an adverse level of soot can accumulate, while further heating the process gas stream up to a higher temperatures, and initiating removal of carbon dioxide from said process gas circulating in said loop, (d) interrupting the injection of water after the temperature has risen sufficiently to favor reduction of the iron ore present in the reducing zone by $H_2$ and CO and after at least an effective threshold amount of $H_2$ is accumulated in the process gas so as to be available to initiate, in the absence of the $H_2O$ injection, an accumulation of $H_2$ and CO to a volume effective ultimately to attain steady-state levels, while also further heating the process gas stream as needed up to normal operative reducing temperatures in the range of 800° to 1,000° C. and, (e) re-initiating the injection of water after sufficient $H_2$ and CO have accumulated to make up at least a major portion of the process gas, while also adjusting all process feeds including iron ore for steady-state operation.

2. The method of claim 1, wherein the source gas is natural gas.

3. The method of claim 1, wherein the temperature in step (c), which favors reduction, begins in the range between 750° and 820° C.

4. The method of claim 1, wherein the steady-state level of hydrogen in the recycle gas in step (d) is between 50 to 70% by volume.

5. The method of claim 1, wherein the pressure range in step (a) is from 2 to 6 $kg/cm^2$ abs.

6. The method of claim 1, wherein the molar ratio of water to carbon in the source gas necessary to inhibit carbon deposition in step (b) is between 0.2 and 0.4.

7. The method of claim 1, wherein the threshold amount of $H_2$ in the process gas fed to the reducing zone in step (c) is from 3% to 8% by volume.

8. The method of claim 1, wherein beginning during step (a) the process gas is continuously circulated in said loop and the recirculating gas effluent from said reducing zone is quench cooled.

9. The method of claim 2, wherein the pressure in step (a) is about 4 $kg/cm^2$ abs.

10. The method of claim 9, wherein the normal operating reducing temperature in step (c) is about 950° C.

11. The method of claim 10, wherein the molar ratio of water to carbon in the natural gas necessary to inhibit carbon deposition in step (b) is about 0.3.

12. The method of claim 11, wherein the temperature in step (c), which favors reduction, begins about 800° C.

13. The method of claim 12, wherein the steady-state level of hydrogen in the recycle gas in step (d) is between 60 to 70% by volume.

14. The method of claim 13, wherein beginning during step (a) the process gas is continuously circulated in said loop and the recirculating gas effluent from said reducing zone is quench cooled.

15. The method according to claim 1, wherein beginning during step (a) the process gas is continuously circulated in said loop and the recirculating gas effluent from said reducing zone is quench cooled; the pressure range in step (a) is from 2 to 6 $kg/cm^2$ abs.; the molar ratio of water to carbon in the source gas necessary to inhibit carbon deposition in step (b) is between 0.2 and 0.4, and the temperature in step (c) which favors reduction, begins in the range between 750° and 820° C.

16. The method of claim 1, wherein the iron ore is charged initially in an amount effective to function as a heat sink to protect the heater from damage due to too rapid a temperature rise, and moving said bed of particles at least intermittently as needed to prevent agglomeration.

17. A method of start-up of an iron ore direct reduction moving-bed process wherein the reducing gases used to reduce the iron ore are produced from natural gas within a reduction vessel, and wherein a process gas stream is circulated in a loop comprising the reduction vessel, a gas heater, and units to remove water and carbon dioxide from the gas circulating in said loop, said method comprising charging particles of iron ore into the reduction vessel which are initially substantially devoid of significant amounts of sponge iron, pressurizing the reduction vessel containing iron ore and maintaining such pressure by introducing natural gas to said loop, simultaneously and gradually increasing the temperature of the process gas stream from ambient to a temperature in the range of 400° t 600° C., thus producing an accumulation of hydrogen as well as an acceptably low level of carbon soot by cracking of natural gas within the reduction vessel; further increasing the temperature of the process gas stream, while injecting water to said loop to prevent further carbon deposition, to promote the production of hydrogen, and to inhibit hydrogen consumption until the concentration of hydrogen is about 3% to 8% by volume, and removing carbon dioxide from said process gas stream circulating in said loop; interrupting the water injection after the temperature has risen sufficiently to favor the reduction of said iron ore and the accumulation of hydrogen until a concentration of hydrogen of about 50% to 70% is achieved while the temperature of the process gas stream reaches its steady-state value; thereafter, injecting water again in an amount sufficient for the reforming of make-up natural gas within the reduction vessel; and adjusting all process feeds to their steady-state values.

18. The method of claim 17, wherein the temperature at which the interruption of the water injection is initiated is between 750° and 820° C.

19. The method of claim 18, wherein the molar ratio of injected water to carbon in the natural gas is 0.2 to 0.4 and the process gas circulating in said loop after exiting from said reduction vessel at elevated temperatures is quench cooled.

20. The method of claim 19 wherein the charging and flow rate of ore particles through the reactor is gradually increased to be essentially continuous and ultimately to achieve normal steady state rates by the end of this start-up process.

* * * * *